(12) United States Patent
Seo et al.

(10) Patent No.: US 7,693,439 B2
(45) Date of Patent: Apr. 6, 2010

(54) FIXING DEVICE, AND METHOD AND DEVICE FOR HEATING CONTROL USED IN THE SAME

(75) Inventors: Hiroshi Seo, Kanagawa (JP); Motokazu Yasui, Kanagawa (JP); Tadashi Ogawa, Tokyo (JP); Hiroshi Koide, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 279 days.

(21) Appl. No.: 11/802,938

(22) Filed: May 29, 2007

(65) Prior Publication Data

US 2008/0044196 A1 Feb. 21, 2008

(30) Foreign Application Priority Data

May 26, 2006 (JP) ............................... 2006-146619

(51) Int. Cl.
G03G 15/20 (2006.01)
(52) U.S. Cl. ........................................................ 399/69
(58) Field of Classification Search .................. 399/67, 399/69; 347/102, 156
See application file for complete search history.

(56) References Cited

U.S. PATENT DOCUMENTS 6,076,951 A * 6/2000 Wang et al. .................... 700/38
7,139,499 B2 * 11/2006 Sasamoto et al. ............. 399/69

2003/0178410 A1 9/2003 Satoh

FOREIGN PATENT DOCUMENTS

| EP | 1 282 015 | 5/2005 |
|---|---|---|
| GB | 2 321 319 | 7/1998 |
| JP | 62-248003 | 10/1987 |
| JP | 08-234802 | 9/1996 |
| JP | 10-097155 | 4/1998 |
| JP | 2000-172107 | 6/2000 |
| JP | 2003-167605 | 6/2003 |
| JP | 2003-345171 | 12/2003 |
| JP | 2004-233543 | 8/2004 |
| JP | 2005-166633 | 6/2005 |

OTHER PUBLICATIONS

European Search Report dated Sep. 4, 2007.

* cited by examiner

*Primary Examiner*—Sandra L Brase
(74) *Attorney, Agent, or Firm*—Harness, Dickey & Pierce, P.L.C.

(57) ABSTRACT

A fixing device includes a pair of rotating members, a heater, a detector, a calculator, a pulse width modulation circuit, and a controller. In at least one embodiment, the pair of rotating members is configured to fix a toner image on a recording medium. The heater is configured to heat at least one of the pair of rotating members to a process temperature when driven with an alternating current. The detector is configured to detect the process temperature. The calculator is configured to calculate an amount of heat to adjust the process temperature to a reference temperature. The pulse width modulation circuit is configured to generate a drive signal having a pulse width modulation cycle divided into first and second off times and an on time inserted therebetween. The controller is configured to control operation of the heater according to the drive signal.

20 Claims, 11 Drawing Sheets

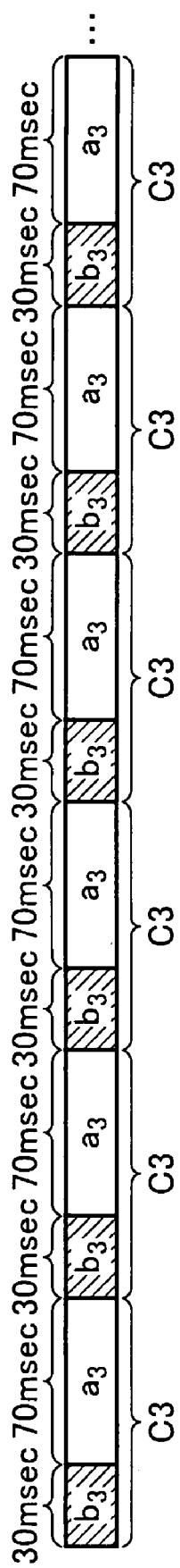
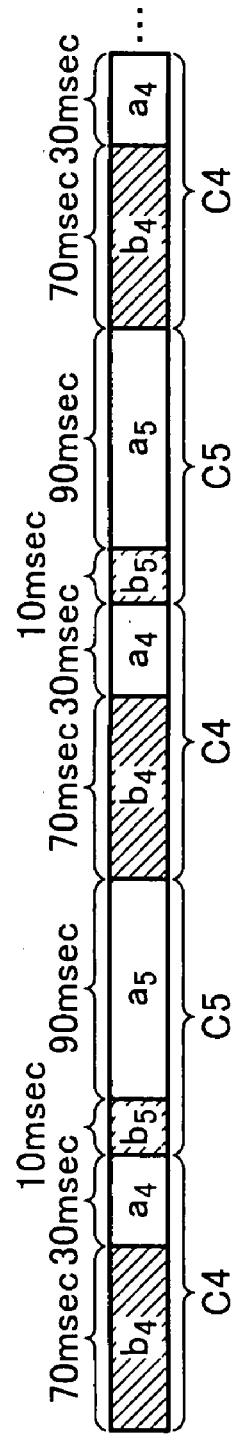
FIG. 9A
FIG. 9B

FIXING DEVICE, AND METHOD AND DEVICE FOR HEATING CONTROL USED IN THE SAME

PRIORITY STATEMENT

The present patent application claims priority under 35 U.S.C. §119 upon Japanese patent application, No. JP2006-146619 filed on May 26, 2006 in the Japan Patent Office, the entire contents of which are hereby incorporated herein by reference in their entirety.

BACKGROUND

1. Field

Example embodiments of the present invention generally relate to a fixing device and/or a method and/or device for heating control used in the same; for example to a fixing device and/or a method and/or device for controlling, by pulse width modulation, a heating mechanism capable of stably driving the heating mechanism and reducing errors due to unstable operation of the heating mechanism.

2. Discussion of the Background

Typically, an image forming apparatus includes a heating system with a heat source used for a particular purpose. The heating system is provided at a fixing unit, a drying unit, or a data erasing unit of the image forming apparatus and used to supply heat for fixing or drying a formed image, or erasing image data.

For example, the heating system is used to dry an image formed with ink in the drying unit of an inkjet printer, and to erase image data on a rewritable medium in the erasing unit of some types of image forming apparatuses.

The heating system is also used to fix a toner image onto a recording medium in the fixing unit of known electrophotographic apparatuses, including printers, copiers, and facsimiles.

In a related art electrophotographic apparatus, the fixing unit includes a heater, a fixing member, and a rotating member, and fixes a layer of toner on a recording medium by melting toner particles with heat and pressure.

Specifically, a first step of fixing the layer of toner on the recording medium is to provide electricity to the heater generating heat. The heater provides heat to the fixing member and maintains the temperature of the fixing member at a desired value. Then, the recording medium is passed through a nip formed between the fixing member and the rotating member, in which the layer of toner is melted with heat and pressure.

In this fixing process, the temperature of the fixing member needs to be adjusted to the desired value because a deviation from the desired value may lead to degradation of image quality.

The degradation of image quality is caused by, for example, adhesion of toner to the fixing member. When the temperature of the fixing member becomes too high, excessive heat is applied to the layer of toner, causing melted toner particles to adhere to the fixing member.

Furthermore, insufficient melting or unstable fixing of toner on the recording medium may also degrade image quality. When the temperature of the fixing member becomes too low, the layer of toner is not provided with sufficient heat and fails to stabilize on the recording medium.

Therefore, the temperature of the fixing member needs to be controlled to avoid such degradation of image quality. In addition, with recent advances in production of color and/or high definition image with high glossiness, which is easily affected by temperature, accuracy in the temperature control of the fixing member becomes more important.

Another issue concerning the temperature control of the fixing member relates to a reduction of waiting time. The waiting time is a length of time that a user has to wait until the electrophotographic apparatus becomes available after switch-on.

One of important factors to reduce the waiting time is a reduction of warm-up time, i.e., an amount of time required to warm up the fixing member to the desired temperature from a cold state. The warm-up time or the waiting time can be reduced by swiftly adjusting the temperature of the fixing member to the desired value. Therefore, the temperature control of the fixing member needs to be performed with swiftness as well as accuracy.

A common technique to reduce the warm-up time is to reduce heat capacity of the fixing member by forming a part of the fixing member, such as a film and a rotating body, with a material of low heat capacity.

For example, a rotation type fixing unit includes a film of low heat capacity. The film is provided to form a nip with a rotating body in which heat is applied to the recording medium.

Another example is a belt-shaped fixing unit including a rotating body of low heat capacity. The belt-shaped fixing unit has two or more rotating bodies, including first and second rotating bodies, and a belt stretched across the rotating bodies.

In the belt-shaped fixing unit, the first rotating body has low heat capacity, and is opposed to an additional rotating body to form a nip. The second rotating body contains a heater inside. The belt transfers heat generated by the heater from the second rotating body towards the first rotating body so as to melt and fix the layer of toner at the nip.

The temperature of the fixing member of low heat capacity rapidly reacts to a change in heat supplied from the heater, reducing time constant in the temperature control. To accurately control the temperature of the fixing member with the reduced time constant, the heat needs to be supplied to the fixing member without a deviation in time or a time lag.

Commonly, the heat supply to the fixing unit from the heater is controlled by increasing or decreasing an amount of supply voltage to the heater. Various methods have been introduced to control temperature through the supply voltage.

One of these methods is an on-off control. In the on-off control, a temperature sensor (e.g., a thermopile or a thermistor) detects the temperature of an object and compares the detected temperature with a set temperature. The heater is switched on and off according to a difference between the temperatures. Namely, electricity is supplied when the detected temperature is below the set temperature, and not supplied when the detected temperature exceeds the set temperature. An amount of heat corresponding to the supply voltage is transmitted from the heater.

The on-off control has a drawback since accurate temperature control is difficult due to dead-time, i.e., time delays in transferring heat between components or detecting temperature of the object, for example. The dead-time induces fluctuations in controlled temperature, referred to as a temperature ripple.

Other examples of the control methods are a proportional-integral-derivative (PID) control and a proportional-integral (PI) control. In the PID or PI control, a temperature sensor detects the temperature of an object and transmits the detected temperature to a compensator. The compensator uses the detected temperature to calculate and output a manipulated variable. The manipulated variable is controlled to an optimum value so that the detected temperature is brought to a setpoint.

For example, in the PID control, the manipulated variable is the sum of proportional, integral, and derivative control actions. The proportional action is proportional to a difference between the detected temperature and the setpoint. The integral action is proportional to an integral of the difference between the detected temperature and the setpoint. The derivative action is proportional to a derivative of the difference between the detected temperature and the setpoint.

The PID control is advantageous to the on-off control, but may also cause deviations in controlled temperature due to the dead-time when applied to a system with a low time constant, referred to as an overshoot and an undershoot.

For obtaining accuracy in the temperature control with a low time constant, these fluctuations and/or deviations of controlled temperature needs to be reduced by compensating for the dead-time.

Background techniques have been developed to perform compensation of the dead-time in the temperature control.

For example, in a background temperature control method, a controller calculates an estimated temperature for a next control timing using an average variation rate of measured temperature. The average variation rate of measured temperature is obtained by dividing a difference between a first temperature and a second temperature measured immediately before the first temperature by a time interval. When the estimated temperature is below or above a target value, the controller changes electricity supplied to a heater by increasing or decreasing an on/off ratio (i.e., a duty cycle) of the electricity supply.

This background temperature control method may fail to eliminate the temperature ripple due to the dead-time that occurs between detection of temperature and driving of the heater when the estimated temperature is substantially deviated from the target value. Namely, this background temperature control method does not meet the dead-time that is generated throughout the fixing process.

In another background temperature control method, the dead-time is compensated with a model in a limited manner. Namely, the dead-time compensation is performed during a temperature adjustment in response to a deviation from a desired value, and is not performed in other cases. A drawback of this temperature control method is that the dead-time compensation with a model may result in errors due to modeling deficiencies under unexpected conditions, such as a change in dead-time caused by disturbances and a significant error in driving the heater.

SUMMARY

This patent specification describes, in at least one embodiment, a novel fixing device for controlling a heating mechanism by pulse width modulation that can stably drive the heating mechanism and reduce errors due to unstable operation of the heating mechanism.

In one example embodiment, a novel fixing device includes a pair of rotating members, a heater, a detector, a calculator, a pulse width modulation circuit, and a controller. The pair of rotating members form a nip therebetween, and is configured to fix a toner image on a recording medium by transferring the recording medium through the nip. The heater is configured to heat at least one of the pair of rotating members to a process temperature when driven with an alternating current supplied from a current source. The detector is configured to detect the process temperature and to output a detection signal indicating the process temperature. The calculator is configured to calculate an amount of heat to adjust the process temperature to a reference temperature according to the detection signal and to output a signal indicating the calculated amount of heat. The pulse width modulation circuit is configured to generate, according to the signal output from the calculator, a drive signal having a pulse width modulation cycle divided into a first off time, a second off time, and an on time inserted between the first and second off times. Each of the first and second off times is a period in which the alternating current is not supplied to drive the heater. The on time is a period in which the alternating current is supplied to drive the heater. The controller is configured to control operation of the heater according to the drive signal.

This patent specification further describes, in at least one embodiment, a novel method of controlling a heating device by pulse width modulation that can stably drive the heating device and reduce errors due to unstable operation of the heating device.

In one example embodiment, a novel method of controlling a heating device includes the steps of heating, detecting, calculating, generating, and controlling. The heating step heats an object to a process temperature with an alternating current supplied from a current source. The detecting step detects the process temperature to output a detection signal indicating the process temperature. The calculating step calculates an amount of heat to adjust the process temperature to a reference temperature according to the detection signal to output a signal indicating the calculated amount of heat. The generating step generates a drive signal having a pulse width modulation cycle divided into a first off time, a second off time, and an on time inserted between the first and second off times. Each of the first and second off times is a period in which the alternating current is not supplied to heat the object. The on time is a period in which the alternating current is supplied to heat the object. The controlling step controls operation of the heating device according to the drive signal.

This patent specification further describes, in at least one embodiment, a novel device for controlling a heating device by pulse width modulation that can stably drive the heating device and reduce errors due to unstable operation of the heating device.

In one example embodiment, a novel heating control device includes a heater, a detector, a calculator, a pulse width modulation circuit, a controller, and a dead-time compensator.

In at least one embodiment, the heater is configured to heat an object to a process temperature when driven with an alternating current supplied from a current source. The detector is configured to detect the process temperature, and to output a detection signal indicating the process temperature. The calculator is configured to calculate an amount of heat to adjust the process temperature to a reference temperature according to the detection signal and to output a signal indicating the calculated amount of heat. The pulse width modulation circuit is configured to generate, according to the signal output from the calculator, a drive signal having a pulse width modulation cycle divided into a first off time, a second off time, and an on time inserted between the first and second off times. Each of the first and second off times is a period in which the alternating current is not supplied to drive the heater. The on time is a period in which the alternating current is supplied to drive the heater. The controller is configured to control operation of the heater according to the drive signal. The dead-time compensator is configured to compensate for dead-time by outputting, in response to the signal output by the calculator, a compensation signal using a model to the calculator.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 9A is another example bar chart showing the pulse width modulation cycle of FIG. 5 performed under the steady-state conditions;

FIG. 9B is an example bar chart showing the pulse width modulation cycle of FIG. 5 performed under the non-steady-state conditions;

DETAILED DESCRIPTION OF EXAMPLE EMBODIMENTS

Figure 1:
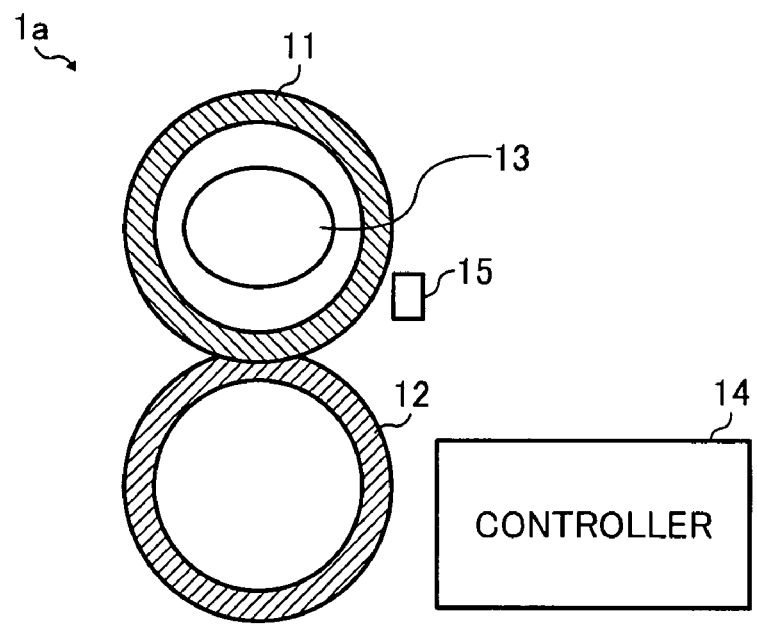
FIG. 1 is a schematic structure of a roller type fixing device according to at least one example embodiment of the present invention.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to described various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

Referring to FIG. 1 of the drawings, a roller type fixing device 1a according to at least one example embodiment of the present invention is described.

In FIG. 1, the fixing device 1a includes a heat roller 11, a pressure roller 12, a heat source 13, a controller 14, and a temperature sensor 15.

In the fixing device 1a, the heat source 13 (e.g., a halogen lamp heater or an induction heater) is disposed inside the heat roller 11 and supplies heat to heat roller 11. The heat roller 11 and the pressure roller 12 form a nip therebetween. An image formed of toner particles (hereinafter referred to as "toner image") is fixed onto a recording medium (not shown) at the nip by applying heat and pressure.

The temperature sensor 15 (e.g., a thermopile or a thermistor) detects the temperature of the heat roller 11. The controller 14 controls the temperature of the heat roller 11 by driving the heat source 13 in accordance with the detected temperature. The heat source 13 is driven by a pulse width modulation (PWM) method.

Figure 2:
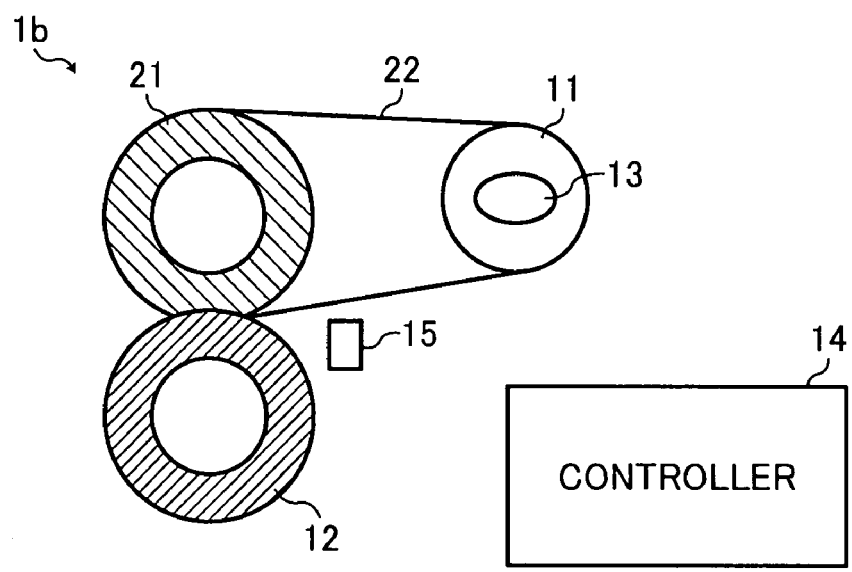
FIG. 2 is a schematic structure of a belt type fixing device according to at least one example embodiment of the present invention.

Referring to FIG. 2, a belt type fixing device 1b according to at least one example embodiment of the present invention is described. In FIG. 2, the belt type fixing device 1b includes the heat roller 11, the pressure roller 12, the heat source 13, the controller 14, and the temperature sensor 15. The belt type fixing device 1b also includes a fixing roller 21 and a fixing belt 22.

In the belt type fixing device 1b, the heat source 13 is disposed inside the heat roller 11 and supplies heat to the heat roller 11. The fixing belt 22 is stretched across the heat roller 11 and the fixing roller 21. The fixing belt 22 and the pressure roller 12 form a nip therebetween. The toner image is fixed onto a recording medium (not shown) at the nip by applying heat and pressure.

The temperature sensor 15 detects the temperature of the fixing belt 22. The controller 14 controls the temperature of the fixing belt 22 by driving the heat source 13 in accordance with the detected temperature.

Additionally, in the fixing devices 1a and 1b, the heat source 13 may be an induction heater that heats an object of a low heat capacity by electromagnetic induction. The induction heater is preferably used for a power or security conscious configuration. In this case, the heat source 13 may be disposed inside or outside the heat roller 11.

Figure 3:
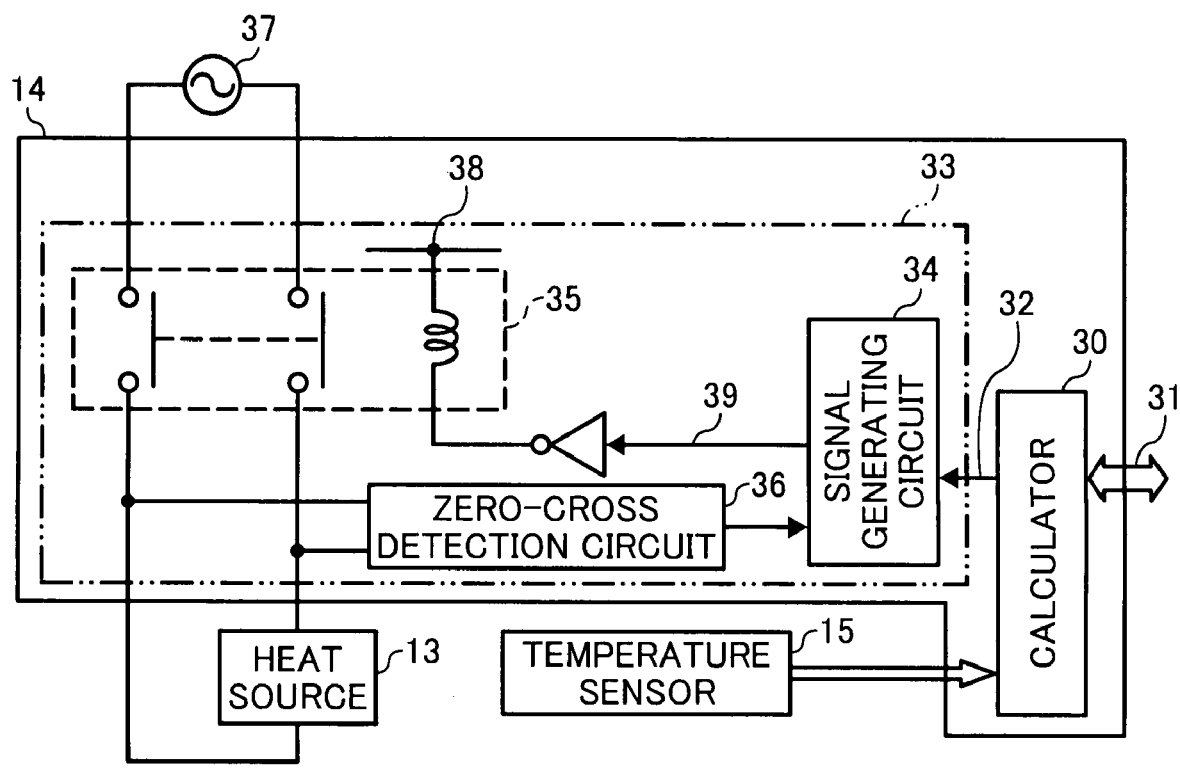
FIG. 3 is a block diagram showing an example of a controller included in one of the fixing devices of FIGS. 1 and 2.

Referring now to FIG. 3, a block diagram showing an example of the controller 14 is described. In FIG. 3, the controller 14 includes a calculator 30, an interface 31, a PWM pulse signal 32, and a PWM drive circuit 33. The controller 14 is connected the heat source 13 and the temperature sensor 15.

The PWM drive circuit 33 includes a signal generating circuit 34, a power switching circuit 35, a zero-cross detection circuit 36, an alternating current (AC) supply 37, a direct current (DC) supply 38, and a PWM drive signal 39.

In FIG. 3, the calculator 30 communicates with a main body (not shown) at the interface 31, and receives a detection signal from the temperature sensor 15.

Then, the calculator 30 calculates the amount of heat required to adjust surface temperature of a fixing member (i.e., the heat roller 11 or the fixing belt 22) to a desired value (hereinafter referred to as "necessary heat amount"), and generates the PWM pulse signal 32 corresponding to the necessary heat amount. The PWM pulse signal 32 is transmitted to the PWM drive circuit 33.

In the PWM drive circuit 33, the signal generating circuit 34 receives the PWM pulse signal 32 to output the PWM drive signal 39 to the power switching circuit 35. The power switching circuit 35 causes the AC supply 37 to power on and off the heat source 13 according to the PWM drive signal 39. The direct current supply 38 provides power to the power switching circuit 35.

As shown in FIG. 3, the controller 14 provides a feedback control mechanism together with the heat source 13 and the temperature sensor 15, in which the detected temperature of the fixing member is used to control the operation of the heat source 13.

Figure 4:
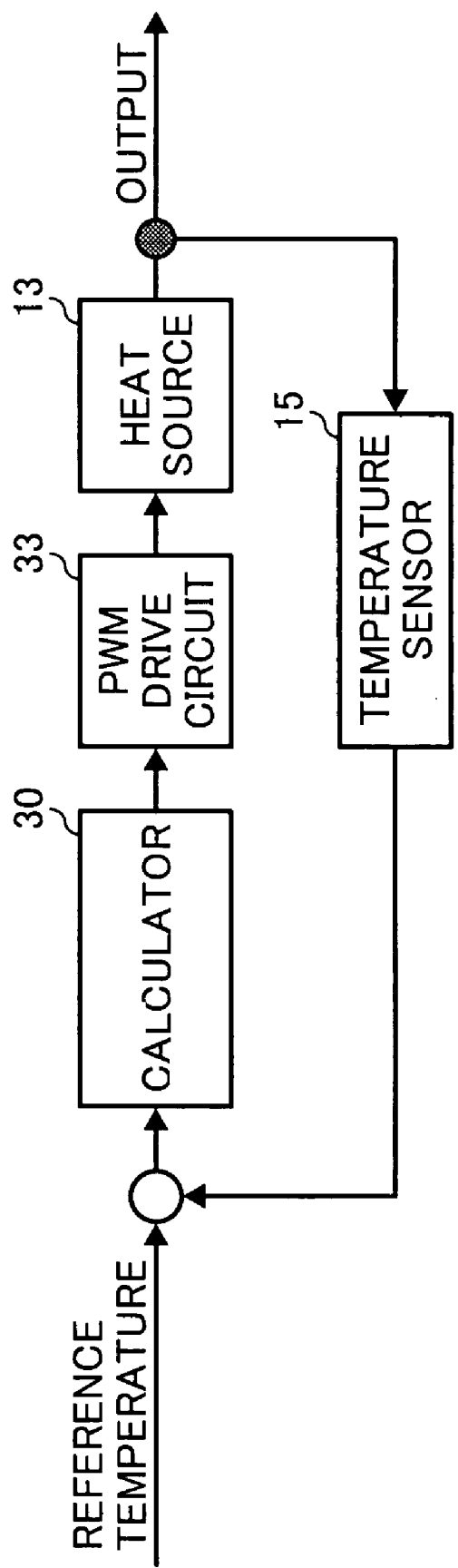
FIG. 4 is a block diagram showing an example of a feedback control mechanism for the controller of FIG. 3.

Referring to FIG. 4, a block diagram showing the feedback control mechanism of the controller 14 is described. In FIG. 4, the feedback control mechanism includes the calculator 30, the PWM drive circuit 33, the heat source 13, and the temperature sensor 15.

First, the calculator 30 receives a signal indicating a reference temperature input from the main unit (not shown), and the detection signal indicating the detected temperature input from the temperature sensor 15.

The calculator 30 calculates the necessary heat amount by comparing the reference temperature with the detected temperature. Then the calculator 30 outputs the PWM pulse signal 32. The PWM pulse signal 32 is a pulse signal with a pulse width and a given period (hereinafter referred to as "pulse width $P_w$" and "PWM period $T_w$"). The pulse width $P_w$ is varied corresponding to the necessary heat amount.

The PWM pulse signal 32 is transmitted to the PWM drive circuit 33. The PWM drive circuit 33 outputs AC power to the heat source 13 in accordance with the pulse width $P_w$ to apply heat to the fixing member.

The temperature sensor 15 detects the surface temperature of the fixing member, and feeds back the detected temperature to the calculator 30 as the detection signal.

In this feedback control mechanism, the calculator 30 continually generates the PWM pulse signal 32 with the pulse width $P_w$ varied in one PWM period $T_w$. The PWM drive circuit 33 generates the PWM drive signal 39 based on the PWM pulse signal 32, and outputs AC power corresponding to the PWM drive signal 39.

The generation of the PWM drive signal 39 and the AC power output as well as the generation of the PWM pulse signal 32 are performed in a cycle corresponding to the PWM period $T_w$ (hereinafter referred to as "PWM cycle").

Figure 5:
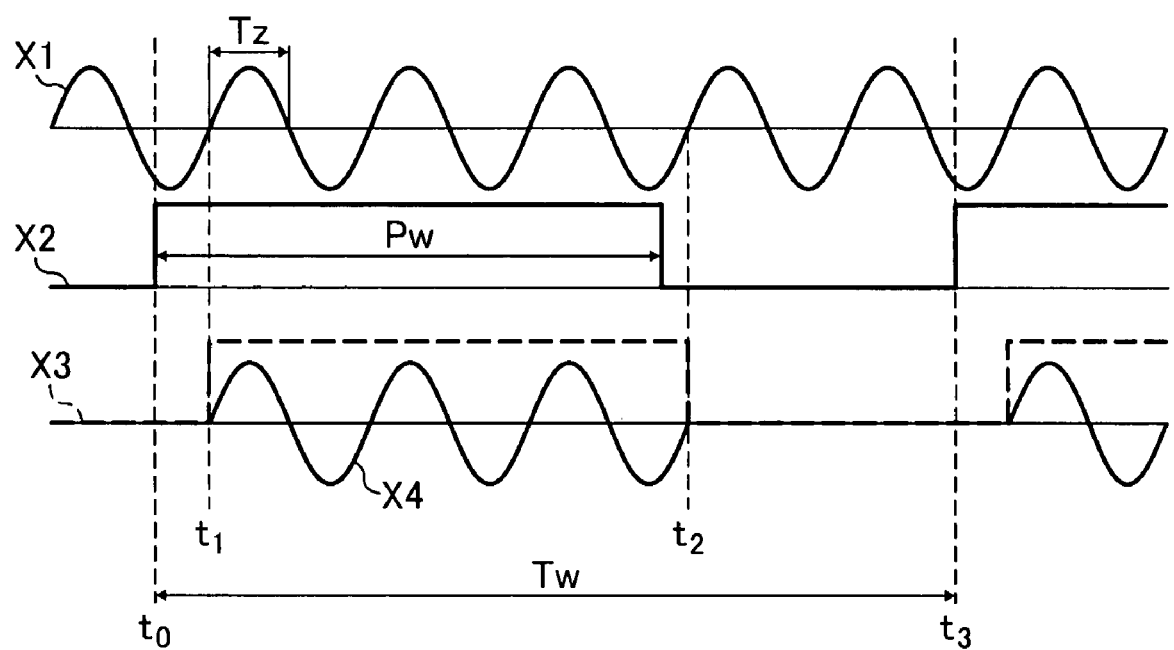
FIG. 5 is a timing diagram showing an example of a pulse width modulation cycle for the feedback control mechanism of FIG. 4.

Referring to FIG. 5, a timing diagram showing an example of the PWM cycle for the feedback control mechanism of FIG. 4 is described.

The timing diagram of FIG. 5 contains first through third rows with a horizontal axis representing time and a vertical axis representing amplitude of waveforms.

The first row shows an AC voltage waveform X1 provided by the AC supply 37. An interval designated by "$T_z$" represents a regular interval at which the AC voltage waveform X1 has zero-crossings (hereinafter referred to as "zero-crossing period $T_z$"). The zero-crossing period $T_z$ corresponds to one half the period of the AC voltage waveform X1.

The second row shows a pulse waveform x2 representing the PWM pulse signal 32. An interval designated by "$P_w$" represents the pulse width $P_w$. An interval designated by "$T_w$" represents the PWM period $T_w$.

The third row shows a drive pulse waveform X3 and an output voltage waveform X4. The drive pulse waveform x3 represents the PWM drive signal 39. The output voltage waveform X4 represents a voltage output to the heat source 13.

In FIG. 5, a time point to is a point at which the pulse waveform X2 goes high (hereinafter referred to as "start point $t_0$"). A time point $t_3$ is a point at which the pulse waveform X2 again goes high (hereinafter referred to as "end point $t_3$"). A time point $t_1$ is a point at which the drive pulse waveform X3 goes high, and a time point $t_2$ is a point at which the drive pulse waveform X3 goes low.

As shown in FIG. 5, the PWM cycle contains a period during which the PWM drive signal 39 is high and the voltage is supplied, i.e., an interval between $t_1$ and $t_2$ (hereinafter referred to as "ON time"), and a period during which the PWM drive signal 39 is low and the voltage is not supplied (hereinafter referred to as "OFF time").

In FIG. 5, the time point $t_1$ is located at a first zero crossing of the AC voltage waveform X1 immediately following the start point $t_0$. The time point $t_2$ is located at a first zero crossing of the AC voltage waveform X1 immediately following a time point $t_0+P_w$, i.e., a point at which the pulse waveform X2 goes low.

The heat source 13 is activated during the ON time and deactivated during the OFF time. The amount of heat supplied by the heat source 13 for each PWM cycle is adjusted by varying the ON time and the OFF time, i.e., varying a ratio of the ON time in one PWM cycle. The ratio of the ON time in one PWM cycle is referred to as a "duty cycle".

The PWM cycle is repeated to control the temperature under steady-state conditions, i.e., conditions in which there is no disturbance that irregularly causes temperature variations, such as continuous feed of paper, change in temperature setting, or change in type of paper, as well as non-steady-state conditions, i.e., conditions in which there are such disturbances.

Under the steady-state conditions, the necessary heat amount is an amount of heat dissipated in the absence of disturbance, which is substantially constant over time. Therefore, the heat source 13 is driven to regularly supply a substantially constant amount of heat.

On the contrary, under the non-steady-state conditions, the necessary heat amount changes due to disturbances. For example, when the temperature of the fixing member becomes low by contacting with a sheet, the heat source 13 is driven to supply an amount of heat lost by the disturbance in addition to the amount of heat dissipated in the absence of disturbance.

Figure 6A:
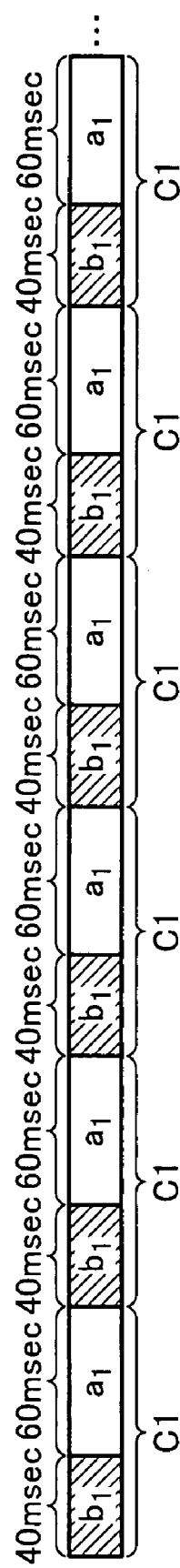
FIG. 6A is an example bar chart showing the pulse width modulation cycle of FIG. 5 performed under steady-state conditions.

Referring to FIG. 6A, an example bar chart showing the PWM cycle of FIG. 5 performed under the steady-state conditions is described.

In FIG. 6A, length of the bar chart represents time length. The bar chart contains time units, each of which represents one PWM cycle C1. Each PWM cycle C1 includes an OFF time $a_1$ and an ON time $b_1$.

In the PWM cycle C1, the OFF time $a_1$ has a length of 60 msec., and the ON time $b_1$ has a length of 40 msec. Consequently, each PWM cycle C1 has a length of 100 msec. with a duty cycle of 40%.

In FIG. 6A, the PWM cycle C1 is repeated so that the OFF time $a_1$ and the ON time $b_1$ are alternately arranged. Therefore, the PWM is performed with the constant duty cycle of 40%.

As the OFF time periodically appears with the same duration, the surface temperature of the fixing member is controlled without causing a significant temperature ripple. Consequently, under the steady-state conditions in which the same PWM cycle is repeated, the feedback mechanism of FIG. 4 works as intended without inducing hunting.

Figure 6B:
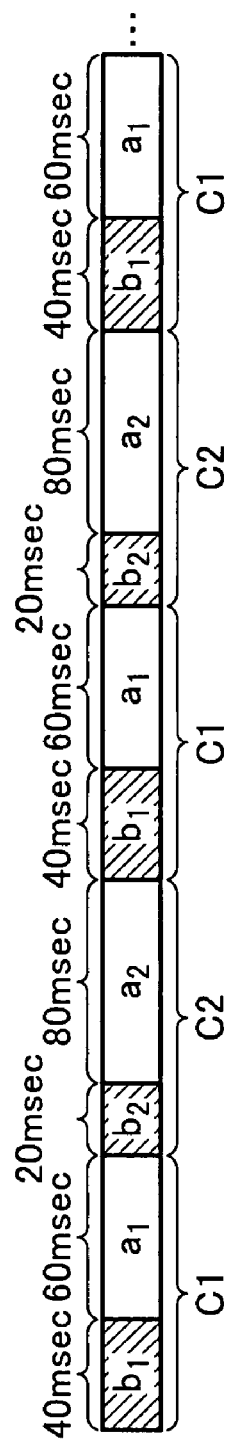
FIG. 6B is an example bar chart showing the pulse width modulation cycle of FIG. 5 performed under non-steady-state conditions.

Referring to FIG. 6B, an example bar chart showing the PWM cycle of FIG. 5 performed under the non-steady-state conditions is described.

In FIG. 6B, the bar chart contains time units, each of which represents one PWM cycle C1 or C2. Each PWM cycle C2 includes an OFF time $a_2$ and an ON time $b_2$.

In the PWM cycle C2, the OFF time $a_2$ has a length of 80 msec., and the ON time $b_2$ has a length of 20 msec. Consequently, each PWM cycle C2 has a length of 100 msec. with a duty cycle of 20%.

In FIG. 6B, the PWM cycles C1 and C2 are alternately repeated with an average duty cycle of 30%. The ON and OFF times appear in an order of, for example, the ON time $b_1$, the OFF time $a_1$, the ON time $b_2$, and the OFF time $a_2$.

In this case, the ON times of different lengths $b_1$ and $b_2$ alternately appear with varying intervals, i.e., the OFF time $a_1$ of 60 msec. and the OFF time $a_2$ of 80 msec. Such a variation in length of the OFF time may induce hunting in the temperature control, leading to a temperature ripple. As a result, under the non-steady-state conditions in which the different PWM cycles C1 and C2 alternately occur, the feedback mechanism of FIG. 4 fails to suppress instability of the controlled temperature.

Figure 7:
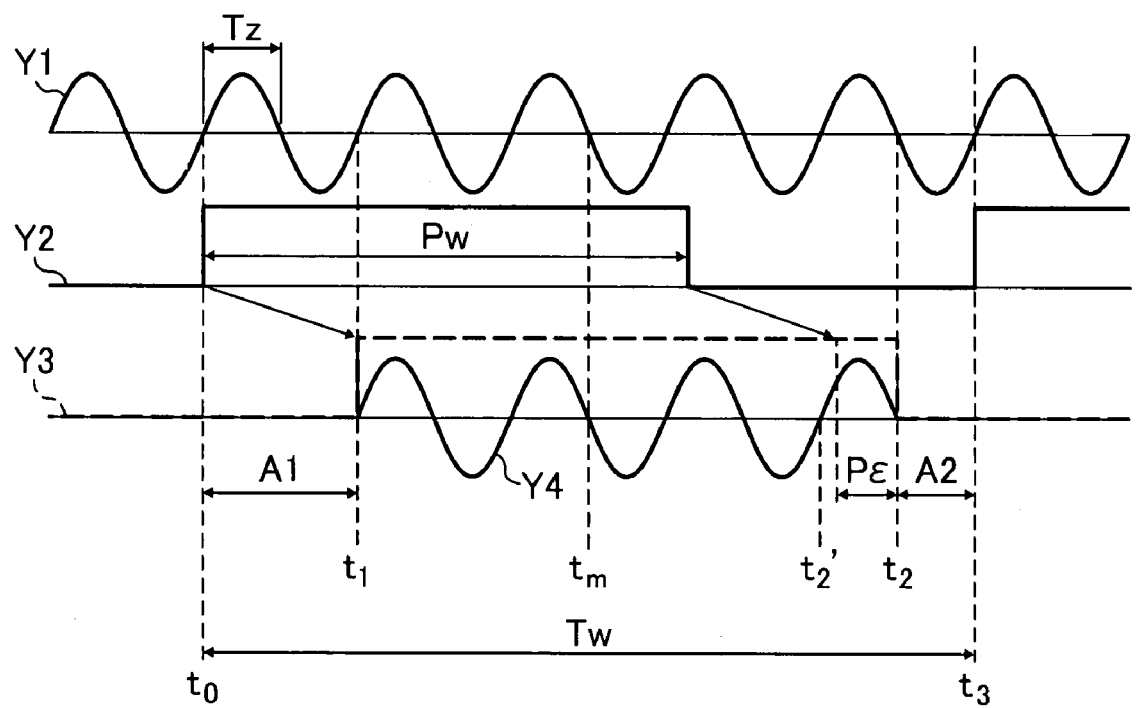
FIG. 7 is a timing diagram showing one example of the pulse width modulation cycle for the feedback control mechanism of FIG. 4 according to at least one example embodiment of the present invention.

Referring now to FIG. 7, a timing diagram showing one example of the PWM cycle for the feedback control mechanism of FIG. 4 according to at least one example embodiment of the present invention is described.

The timing diagram of FIG. 7 contains first through third rows, representing signals in a similar manner as FIG. 5.

The first row shows an AC voltage waveform Y1 provided by the AC supply 37.

The second row shows a pulse waveform Y2 representing the PWM pulse signal 32.

The third row shows a drive pulse waveform Y3 and an output voltage waveform Y4. The drive pulse waveform Y3 represents the PWM drive signal 39. The output voltage waveform Y4 represents a voltage output to the heat source 13.

In FIG. 7, a time point $t_m$ corresponds to a point $t_0+T_w/2$, i.e., a midpoint of the PWM period $T_w$ (hereinafter referred to as "midpoint $t_m$").

As shown in FIG. 7, the ON time is substantially centered in the PWM period $T_w$, divided into two sections of equal or nearly equal lengths with respect to the midpoint $t_m$.

As a result, the OFF time is divided into separated time intervals, designated as "A1" and "A2" in FIG. 7. The interval A1 is located between the start point $t_0$ and the midpoint $t_m$. The interval A2 is located between the midpoint $t_m$ and the end point $t_3$.

In addition, the drive pulse waveform Y3 is generated so that the ON time has a length substantially equal to the pulse width $P_w$. The difference between the ON time and the pulse width $P_w$ (designated as "$P_\epsilon$" in FIG. 7) is less than the zero-crossing period $T_z$.

Further, each of the time points $t_1$ and $t_2$ is located at a zero crossing of the AC voltage waveform Y1 so that the ON time is an integral multiple of the zero-crossing period $T_z$.

Consequently, when the PWM period $T_w$ is an integral multiple of $T_z$ with the start point $t_0$ and the end point $t_3$ each located at a zero crossing, the total OFF time is an even or odd multiple of $T_z$ with the intervals A1 and A2 each being an integral multiple of $T_z$.

For example, when the PWM period $T_w$ is an integral multiple of $T_z$ and the OFF time is an even multiple of $T_z$, i.e., $T_w=nT_z$ and $T_{off}=2mT_z$ (where "$T_{off}$" represents the OFF time, "n" is a natural number greater than 2, and "m" is a natural number smaller than n/2), the intervals A1 and A2 are both identical to $mT_z$, substantially equal to each other.

On the contrary, when the PWM period $T_w$ is an integral multiple of $T_z$ and the OFF time is an odd multiple of $T_z$, i.e., $T_w=nT_z$ and $T_{off}=(2m-1)T_z$ (where "$T_{off}$" represents the OFF time, "n" is a natural number greater than 2, and "m" is a natural number smaller than n/2), the intervals A1 and A2 are different from each other by $T_z$, that is, $(A1, A2)=(mT_z, (m-1)T_z)$ or $((m-1)T_z, mT_z)$.

Furthermore, the drive pulse waveform Y3 may be generated with the ON time expanded or compressed from the pulse width $P_w$.

For example, in FIG. 7, the pulse width $P_w$ is expanded to the length of ON time by the error of $P_\epsilon$. The length of error $P_\epsilon$ may be reduced by removing the point at which the drive pulse waveform Y3 goes low from the time point $t_2$ to another time point designated by "$t_2'$". By doing so, the pulse width $P_w$ is compressed by an error reduced to equal to or smaller than half the length of $T_z$.

In this case, the length of the ON time in each PWM period $T_w$ is controlled so that the PWM cycle is repeated with the ON time alternately expanded and compressed. By avoiding the ON time continually expanded or compressed, an inaccuracy caused by accumulated errors between the pulse width $P_w$ and the actual ON time can be reduced.

Figure 8A:
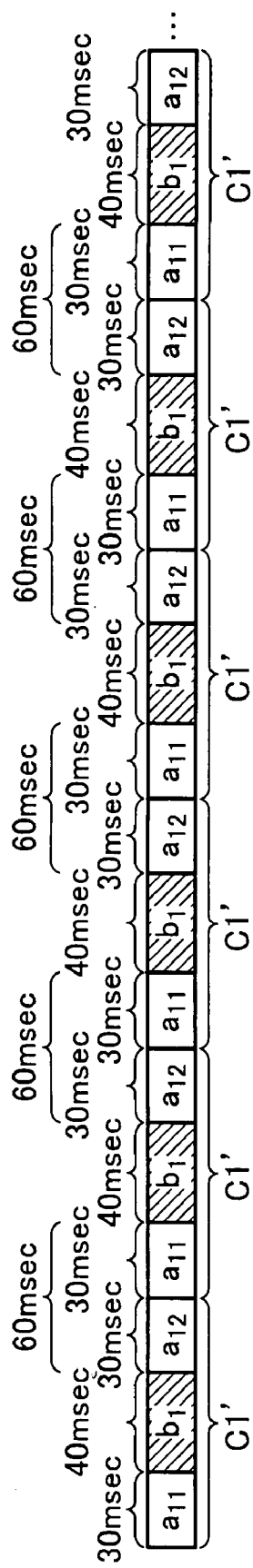
FIG. 8A is an example bar chart showing the pulse width modulation cycle of FIG. 7 performed under the steady-state conditions.

Referring to FIG. 8A, an example bar chart showing the PWM cycle of FIG. 7 performed under the steady-state conditions is described.

In FIG. 8A, the bar chart contains time units, each of which represents one PWM cycle C1'. Each PWM cycle C1' includes first and second OFF times $a_{11}$ and $a_{12}$, and an ON time $b_1$ located therebetween. The first OFF time all corresponds to the first interval A1, and the second OFF time $a_{12}$ corresponds to the second interval A2.

In the PWM cycle C1', each of the first and second OFF times $a_{11}$ and $a_{12}$ has a length of 30 msec., and the ON time $b_1$ has a length of 40 msec. Consequently, each PWM cycle C1' has a length of 100 msec. with a duty cycle of 40%.

In FIG. 8A, the PWM cycle C1' is repeated so that the ON time $b_1$ of 40 msec. appears with a constant interval of 60 msec., which is the total of first and second OFF times $a_{12}+a_{11}$. Therefore, the PWM is performed with the constant duty cycle of 40%.

As the OFF time periodically appears with the same duration, the surface temperature of the fixing member is controlled without causing a significant temperature ripple. As a result, under the steady-state conditions in which the same PWM cycle C1' is repeated, the feedback mechanism of FIG. 4 works as intended without inducing hunting.

Figure 8B:
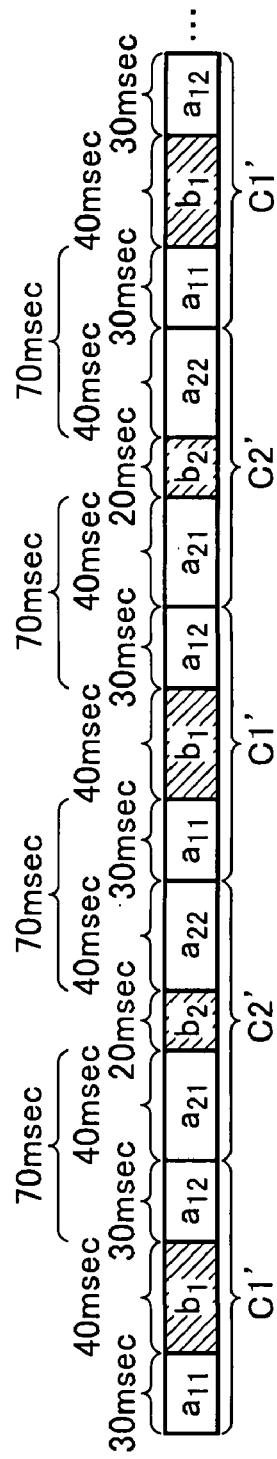
FIG. 8B is an example bar chart showing the pulse width modulation cycle of FIG. 7 performed under the non-steady-state conditions.

Referring to FIG. 8B, an example bar chart showing the PWM cycle of FIG. 7 performed under the non-steady-state conditions is described.

In FIG. 8B, the bar chart contains time units, each of which represents one PWM cycle C1' or C2'. Each PWM cycle C2' is divided into first and second OFF times $a_{21}$ and $a_{22}$, and an ON time $b_2$.

In the PWM cycle C2', each of the first and second OFF times $a_{21}$ and $a_{22}$ has a length of 40 msec., and the ON time $b_2$ has a length of 20 msec. Consequently, each PWM cycle C2' has a length of 100 msec. with a duty cycle of 20%.

In FIG. 8B, the PWM cycles C1' and C2' are alternately repeated with an average duty cycle of 30%. The ON and OFF times appear in an order of, for example, the ON time $b_1$, the OFF times $a_{12}$ and $a_{21}$ contiguously arranged, the ON time $b_2$, and the OFF times $a_{22}$ and $a_{11}$ contiguously arranged.

In this case, the ON times of different lengths $b_1$ and $b_2$ alternately appear with a constant interval of 70 msec., which is the total of contiguous OFF times $a_{12}+a_{21}$ or $a_{22}+a_{11}$.

As the OFF time periodically appears with the same duration, the surface temperature of the fixing member is controlled without causing a significant temperature ripple. As a result, even under the non-steady-state conditions in which the different PWM cycles C1' and C2' alternately occur, the feedback mechanism of FIG. 4 works as intended without inducing hunting.

Referring to FIG. 9A, another example bar chart showing the PWM cycle of FIG. 5 performed under the steady-state conditions is described.

In FIG. 9A, the bar chart contains time units, each of which represents one PWM cycle C3. Each PWM cycle C3 includes an OFF time $a_3$ and an ON time $b_3$.

In the PWM cycle C3, the OFF time $a_3$ has a length of 70 msec., and the ON time $b_3$ has a length of 30 msec. Consequently, each PWM cycle C3 has a length of 100 msec. with a duty cycle of 30%.

In FIG. 9A, the PWM cycle C3 is repeated so that the OFF portion $a_3$ and the ON portion $b_3$ are alternately arranged. Therefore, the PWM is performed with the constant duty cycle of 30%.

As the OFF time periodically appears with the same duration, the surface temperature of the fixing member is controlled without causing a significant temperature ripple. As a result, under the steady-state conditions in which the same PWM cycle C3 is repeated, the feedback mechanism of FIG. 4 works as intended without inducing hunting.

Referring to FIG. 9B, an example bar chart showing the PWM cycle of FIG. 5 performed under the non-steady-state conditions is described.

In FIG. 9B, the bar chart contains time units, each of which represents one PWM cycle C4 or C5. Each PWM cycle C4 is divided into an OFF time $a_4$ and an ON time $b_4$. Each PWM cycle C5 is divided into an OFF time $a_5$ and an ON time $b_5$.

In the PWM cycle C4, the OFF time $a_4$ has a length of 30 msec., and the ON time $b_2$ has a length of 70 msec. Consequently, each PWM cycle C4 has a length of 100 msec. with a duty cycle of 70%.

In the PWM cycle C5, the OFF time $a_5$ has a length of 90 msec., and the ON time $b_5$ has a length of 10 msec. Consequently, each PWM cycle C5 has a length of 100 msec. with a duty cycle of 10%.

In FIG. 9B, the PWM cycles C4 and C5 are alternately repeated with an average duty cycle of 40%. The ON and OFF times appear in an order of, for example, the ON time $b_4$, the OFF time $a_4$, the ON time $b_5$, and the OFF time $a_5$.

In this case, the ON times of different lengths $b_4$ and $b_5$ alternately appear with varying intervals, i.e., the OFF time $a_4$ of 30 msec. and the OFF time $a_5$ of 90 msec. Such a variation in the OFF time may induce hunting in the temperature control, leading to a temperature ripple. As a result, under the non-steady-state conditions in which the different PWM cycles C4 and C5 alternately occur, the feedback mechanism of FIG. 4 fails to suppress instability of the controlled temperature.

Figure 10A:
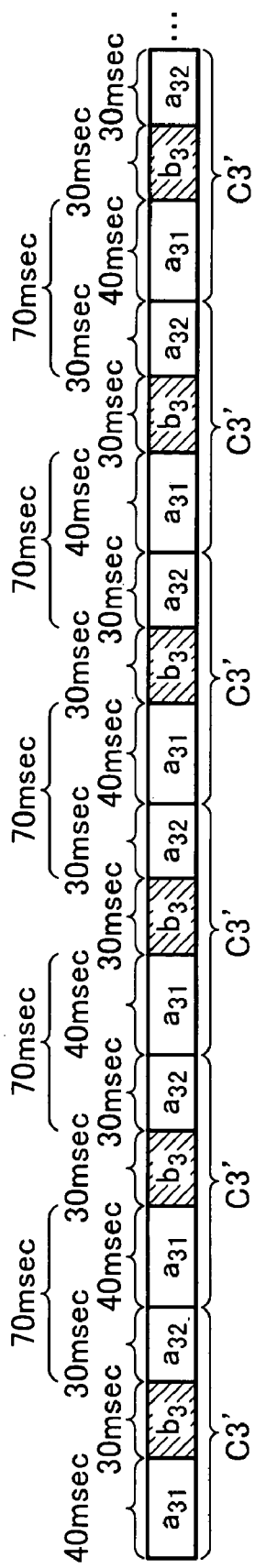
FIG. 10A is another example bar chart showing the pulse width modulation cycle of FIG. 7 performed under the steady-state conditions.

Referring to FIG. 10A, an example bar chart showing the PWM cycle of FIG. 7 performed under the steady-state conditions is described.

In FIG. 10A, the bar chart contains time units, each of which represents one PWM cycle C3'. Each PWM cycle C3' includes first and second OFF times $a_{31}$ and $a_{32}$, and an ON time $b_3$ located therebetween. The first OFF time $a_{31}$ corresponds to the first interval A1, and the second OFF time $a_{32}$ corresponds to the second interval A2. In this case, the total of the OFF times $a_{31}$ and $a_{32}$ is an odd multiple of $T_z$ of 10 msec.

In the PWM cycle C3', the first OFF time $a_{31}$ has a length of 40 msec., the second OFF time $a_{32}$ has a length of 30 msec., and the ON time $b_3$ has a length of 30 msec. Consequently, each PWM cycle C3' has a length of 100 msec. with a duty cycle of 30%.

In FIG. 10A, the PWM cycle C3' is repeated so that the ON time $b_3$ of 30 msec. appears with a constant interval of 70 msec., which is the total of first and second OFF times $a_{32}+a_{31}$. Therefore, the PWM is performed with the constant duty cycle of 30%.

As the OFF time periodically appears with the same duration, the surface temperature of the fixing member is controlled without causing a significant temperature ripple. As a result, under the steady-state conditions in which the same PWM cycle C3' is repeated, the feedback mechanism of FIG. 4 works as intended without inducing hunting.

Figure 10B:
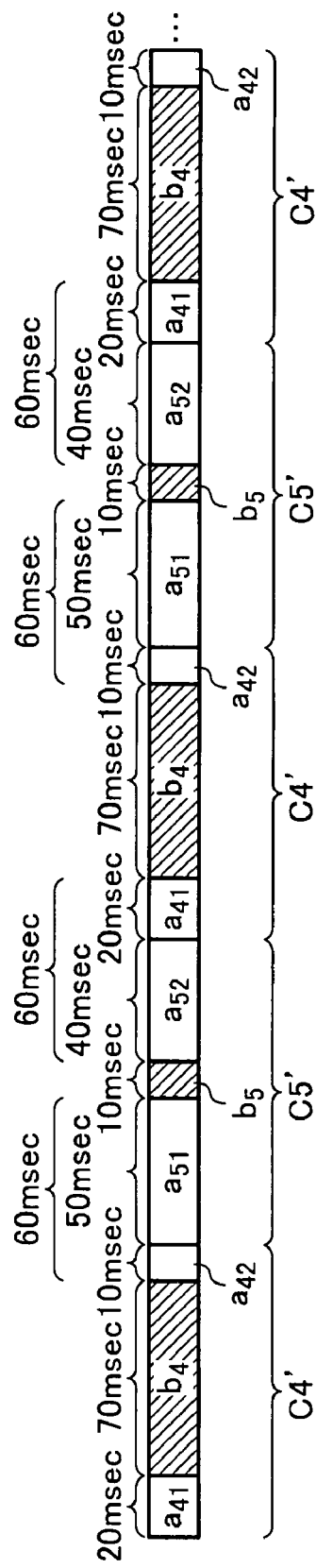
FIG. 10B is another example bar chart showing the pulse width modulation cycle of FIG. 7 performed under the non-steady-state conditions.

Referring to FIG. 10B, an example bar chart showing the PWM cycle of FIG. 7 performed under the non-steady-state conditions is described.

In FIG. 10B, the bar chart contains time units, each of which represents one PWM cycle C4' or C5'. Each PWM cycle C4' is divided into first and second OFF times $a_{41}$ and $a_{42}$, and an ON time $b_4$. Each PWM cycle C5' is divided into first and second OFF times $a_{51}$ and $a_{52}$, and an ON time $b_5$.

In this case, the total of the first and second OFF times $a_{41}$ and $a_{42}$, and the total of the first and second OFF times $a_{51}$ and $a_{52}$ each is an odd multiple of $T_z$ of 10 msec.

In the PWM cycle C4', the first OFF time $a_{41}$ has a length of 20 msec., the second OFF time $a_{42}$ has a length of 10 msec., and the ON time $b_4$ has a length of 70 msec. Consequently, each PWM cycle C4' has a length of 100 msec. with a duty cycle of 70%.

In the PWM cycle C5', the first OFF time $a_{51}$ has a length of 50 msec., the second OFF time $a_{52}$ has a length of 40 msec., and the ON time $b_5$ has a length of 10 msec. Consequently, each PWM cycle C5' has a length of 100 msec. with a duty cycle of 10%.

In FIG. 10B, the PWM cycles C4' and C5' are alternately repeated with an average duty cycle of 40%. The ON and OFF times appear in an order of, for example, the ON time $b_4$, the OFF times $a_{42}$ and $a_{51}$ contiguously arranged, the ON time $b_5$, and the OFF times $a_{52}$ and $a_{41}$ contiguously arranged.

In this case, the ON times of different lengths $b_4$ and $b_5$ alternately appear with a constant interval of 60 msec., which is the total of contiguous OFF times $a_{42}+a_{51}$ or $a_{52}+a_{41}$.

As the OFF time periodically appears with the same duration, the surface temperature of the fixing member is controlled without causing a significant temperature ripple. As a result, even under the non-steady-state conditions in which the different PWM cycles C4' and C5' alternately occur, the feedback mechanism of FIG. 4 works as intended without inducing hunting.

Referring back to FIG. 7, the PWM period $T_w$ has a constant length equal to an integral multiple of the one half the period of the AC voltage waveform Y1. Thereby, both the start point to and the end point $t_3$ of each PWM cycle are located at zero-crossings of the AC voltage waveform Y1.

The AC voltage waveform Y1 provided by the AC supply 37 may vary in frequency according to the locality. For example, the AC supply 37 can have a frequency of 50 Hz or 60 Hz. Consequently, the period of the AC voltage waveform Y1 can be 1000/50 msec. or 1000/60 msec.

To meet the varying frequency of the AC supply 37, the PWM period $T_w$ is determined to satisfy the following equation:

$$T_w(\text{sec.}) = L \times (½f_{50}) = M \times (½f_{60}) \quad \text{Equation [1.1]},$$

where "L" and "M" are arbitrary natural numbers, and "$f_{50}$" and "$f_{60}$" are possible frequencies (Hz).

The Equation [1.1] can be rewritten as:

$$M = (f_{50}/f_{60})L \quad \text{Equation [1.2]}.$$

For example, substituting $f_{50}=50$ and $f_{60}=60$ in the Equation [1.2] yields M=1.2 L. In this case, the PWM period $T_w$ can be represented as follows:

$$T_w(\text{sec.}) = 0.05N,$$

where "N" is an arbitrary natural number.

When the PWM period $T_w$ is determined to satisfy the Equation [1.1], the midpoint $t_m$ in FIG. 7 does not necessarily correspond to a zero-crossing of the AC voltage waveform Y1. To center the ON time $T_{on}$ in the PWM cycle in accordance with the zero-crossings, the midpoint $t_m$ needs to be located at a zero-crossing of the AC voltage waveform Y1.

Therefore, the constant length of the PWM period $T_w$ may be preferably equal to an integral multiple of the period of the AC voltage waveform Y1. Thereby, the start point $t_0$, the endpoint $t_3$, and the midpoint $t_m$ of each PWM cycle may be located at zero-crossings of the AC voltage waveform Y1.

In this case, the PWM period $T_w$ is determined to satisfy the following equation:

$$T_w(\text{sec.}) = L \times (1/f_{50}) = M \times (1/f_{60}) \quad \text{Equation [2.1]},$$

where "L" and "M" are arbitrary natural numbers, and "$f_{50}$" and "$f_{60}$" are possible frequencies (Hz).

Thus, the PWM period $T_w$ is determined as a common multiple of inverses of the possible frequencies of the AC supply 37.

The PWM period $T_w$ obtained by assuming $f_{50}=50$ and $f_{60}=60$ in the Equation [2.1] can be represented as follows:

$$T_w(\text{sec.}) = 0.10N,$$

where "N" is an arbitrary natural number.

By determining the PWM period $T_w$ based on the above equations, the control unit 14 can be used regardless of the frequency provided by the AC supply 37.

Figure 11A:
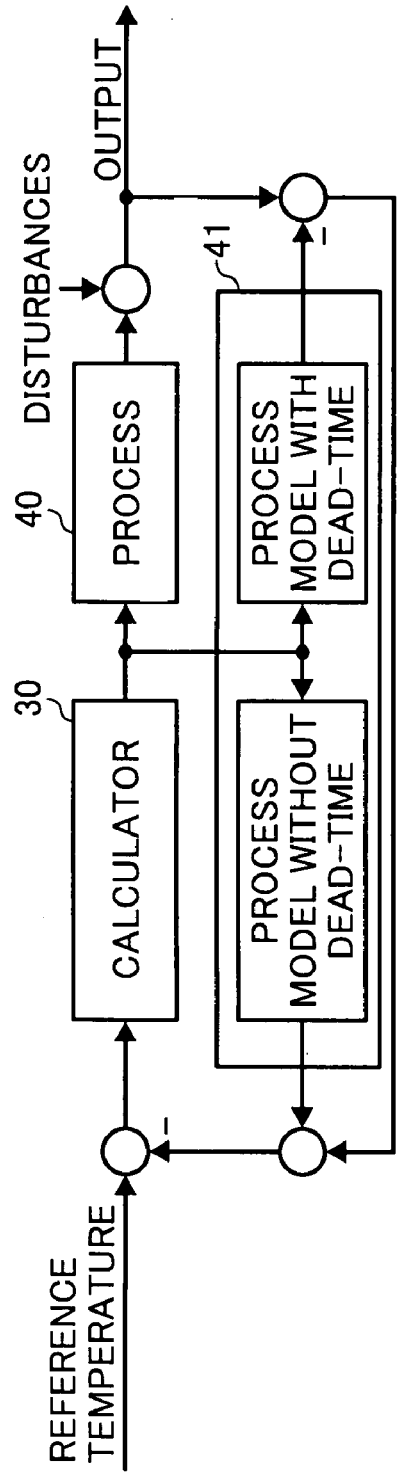
FIG. 11A is a block diagram showing another example of the feedback control mechanism for the controller of FIG. 3.
Figure 11B:
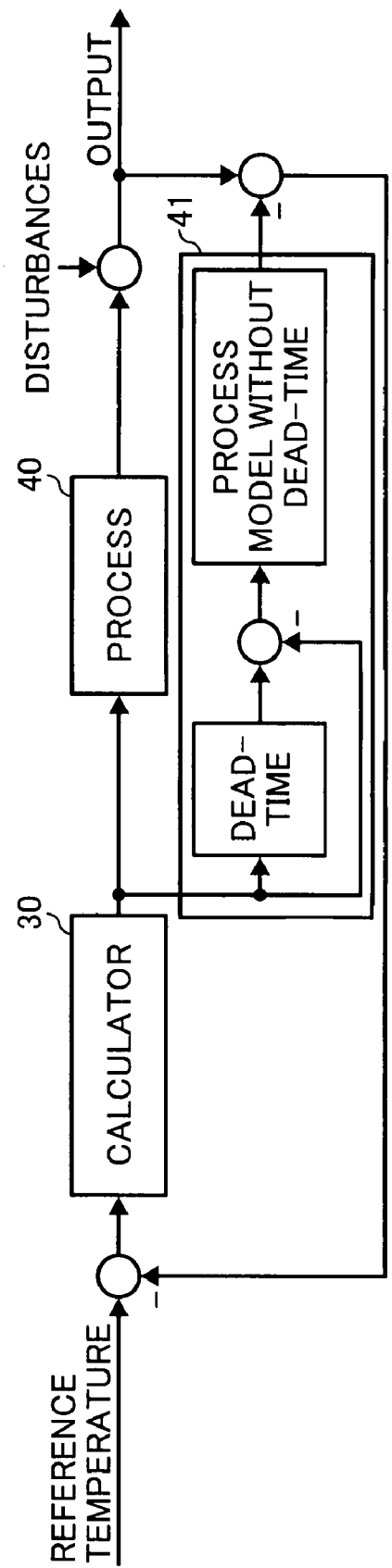
FIG. 11B is another block diagram showing the example of the feedback control mechanism of FIG. 11B.

Referring now to FIGS. 11A and 11B, block diagrams showing the feedback control mechanism of the controller 14 according to another example embodiment of the present specification are described.

The block diagrams of FIGS. 11A and 11B both show a same feedback control mechanism of the controller 14.

In FIGS. 11A and 11B, the feedback control mechanism includes the calculator 30, a process 40, and a Smith predictor 41.

The process 40 represents components of the fixing device 1a or 1b, such as the PWM drive circuit 33, the heat source 13, and the fixing member transferring heat. Each of these components involves a time delay in the feedback control mechanism, which may cause fluctuations in the detected temperature.

For example, the time delay includes a time error such as a difference between the PWM pulse signal 32 and the PWM drive signal 39, i.e., the error $P_\epsilon$ in the PWM period $T_w$.

In addition, the time delay occurs when the heat is transferred between the heat source 13 and the temperature sensor 15. The time delay also occurs due to the given PWM period $T_w$ in the PWM drive circuit 33. These time delays in the feedback control mechanism are referred to as dead-time.

The Smith predictor 41 is used to compensate for the dead-time. Namely, the Smith predictor 41 includes a process model without dead-time and a process model with dead-time, allowing to design the calculator 30 as if there were no time delays in the process.

Figure 12:
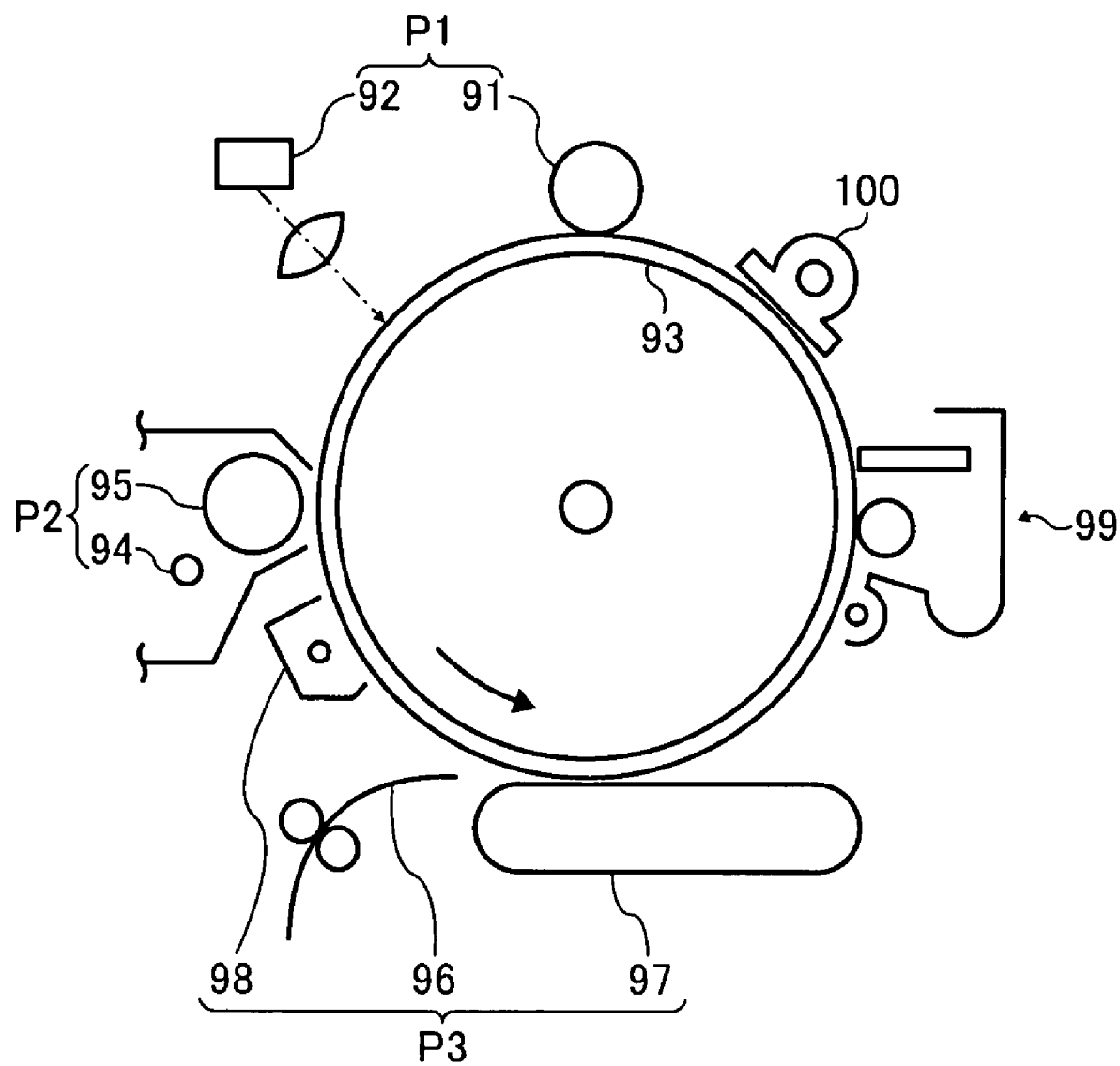
FIG. 12 is a schematic structure of an image forming apparatus according to at least one example embodiment of the present invention.

Referring now to FIG. 12, an image forming apparatus according to at least one example embodiment of the present invention is described.

The image forming apparatus includes at least a latent image forming unit P1, a development unit P2, a transfer unit P3, and a fixing unit (not shown). The image forming apparatus also includes an image carrier 93, a cleaning unit 99, and a discharge unit 100, and a conveyance unit (not shown).

The latent image forming unit P1 includes a first charger 91 and an irradiator 92.

The development unit P2 includes an agitator 94 and a development roller 95.

The transfer unit P3 includes a recording medium 96, a transfer belt 97, and a second charger 98.

The fixing unit includes any one of the fixing devices 1a and 1b.

In the latent image forming unit P1, the first charger 91 uniformly charges a surface of the image carrier 93. Then the irradiator 92 irradiates the surface of the image carrier 93 to form an electrostatic latent image.

The first charger 91 may be any one of a contact type charger, such as a roller, a brush, a film, and a rubber blade, and a non-contact type charger, such as a corotron and a scorotron.

The irradiator 92 includes optics and a light source. The optics may be a rod-lens array system, a laser system, a liquid crystal shutter system. The light source may be any one of a light emitting diode, a laser diode (LD), and an electroluminescence (EL).

In the development unit P2, the agitator 94 charges toner particles by agitation. Then the development roller 95 holds the charged toner particles on a magnetic surface, and rotates to cause a part of the toner particles to move towards the charged surface of the image carrier 93 with electrical attraction, forming a visible toner image.

Charging the toner particles may be performed to a same or opposite polarity of the charged image carrier 93, i.e., the visible toner image may be formed by negative development or positive development.

Additionally, the development may be any dry powder technique, including a cascade process, a powder cloud process, and a fur brush process. Alternatively, the development may be performed by liquid development techniques.

In the transfer unit P3, the visible toner image on the image carrier is charged by the second charger 98 before transfer. Then the image carrier 93 is charged to transfer the visible toner image onto the recording medium 96, which is conveyed by the transfer belt 97. The transfer belt 97 is charged to an opposite polarity of the toner particles forming the visible image so that the toner particles can be attracted to the recording medium 96.

The transfer may be performed by any contact transfer process or any non-contact transfer process. For example, another component such as a transfer roller may be used in place of the transfer belt 97.

In the fixing unit, the transferred visible image is fixed onto the recording medium. Preferably, the fixing is performed by heating the toner particles to a temperature in a range from 80° C. to 200° C.

To fix toner images of different colors, the toner images of different colors may be superimposed one upon another on the recording medium 96, and fixed thereon at a time. Alternatively, the toner images of different colors are transferred and fixed one by one.

In addition, the image carrier 93 is cleaned by the cleaning unit 99 and discharged by the discharge unit 100 using any known cleaning and discharge techniques.

Embodiments of this invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. Embodiments of the present invention may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus., the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to Floppy Disks™, cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A fixing device, comprising:
a pair of rotating members forming a nip therebetween to fix a toner image on a recording medium by transferring the recording medium through the nip;
a heater to heat at least one of the pair of rotating members to a process temperature when driven with an alternating current supplied from a current source;
a detector to detect a process temperature and to output a detection signal indicating the process temperature;
a calculator to calculate an amount of heat to adjust the process temperature to a reference temperature according to the detection signal and to output a signal indicating the calculated amount of heat thereafter being output;
a pulse width modulation circuit to generate, according to the signal output from the calculator, a drive signal having a pulse width modulation cycle divided into a first off time, a second off time, and an on time between the first and second off times, the first and second off times each being a period in which the alternating current remains unsupplied to drive the heater, and the on time being a period in which the alternating current is supplied to drive the heater; and a controller to control operation of the heater according to the drive signal, wherein the signal output from the calculator is a pulse signal having a pulse width proportional to the calculated amount of heat.

2. The fixing device according to claim 1, wherein the pulse width modulation cycle has a length of $nT_z$, the first off time has a length of $sT_z$, and the second off time has a length of $tT_z$ with "n" being an integer equal to or greater than three, "s" and "t" each being a positive integer smaller than n, and "$T_z$" representing a zero crossing period equivalent to half a cycle of a sine wave of the alternating current.

3. The fixing device according to claim 2, wherein the first and second off times are equal to each other, when a total of the first and second off times is an even multiple of $T_z$, and the first and second off times are different from each other by $T_z$ and arranged in a fixed order within the pulse width modulation cycle, when the total of the first and second off times is an odd multiple of $T_z$.

4. The fixing device according to claim 3, wherein the first and second off times are arranged so that the first off time appears prior to the second off time within the pulse width modulation cycle, when the total of the first and second off times is an odd multiple of $T_z$.

5. The fixing device according to claim 1, wherein the pulse width modulation cycle has a length determined as a common multiple of Inverses of frequencies of the alternating current to be used with the fixing device.

6. The fixing device according to claim 1, wherein the pulse width modulation circuit generates the drive signal with the on time of a length corresponding to an interval between first and second zero crossings of the alternating current in the pulse width modulation cycle, the first zero crossing being nearest to a point at which the pulse signal transits from low to high and the second zero crossing being nearest to a point at which the pulse signal transits from high to low.

7. The fixing device according to claim 1, further comprising:

a dead-time compensator to compensate for dead-time by outputting, in response to the signal output by the calculator, a compensation signal using a model to the calculator.

8. An image forming apparatus, comprising:

an image forming unit to form an electrostatic latent image on an image carrier;

a development unit to develop the electrostatic latent image with toner to obtain a toner image;

a transfer unit to transfer the toner image onto a recording medium; and the fixing device of claim 1 to fix the toner image on the recording medium.

9. A method of controlling a heating device, comprising:

heating an object to a process temperature with an alternating current supplied from a current source;

detecting the process temperature to output a detection signal indicating the process temperature;

calculating an amount of heat to adjust a process temperature to a reference temperature according to the detection signal and outputting a signal indicating the calculated amount of heat;

generating a drive signal having a pulse width modulation cycle divided into a first off time, a second off time, and an on time between the first and second off times, the first and second off times each being a period in which the alternating current remains unsupplied to perform the heating, and the on time being a period in which the alternating current is supplied to perform the heating; and controlling operation of the heating device according to the drive signal, wherein outputting the signal indicating the calculated amount of heat includes outputting a pulse signal having a pulse width proportional to the calculated amount of heat.

10. The method of controlling a heating device according to claim 9, wherein the pulse width modulation cycle has a length of $nT_z$, the first off time has a length of $sT_z$, and the second off time has a length of $tT_z$ with "n" being an integer equal to or greater than three, "s" and "t" each being a positive integer smaller than n, and "$T_z$" representing a zero crossing period equivalent to half a cycle of a sine wave of the alternating current.

11. The method of controlling a heating device according to claim 10, wherein when a total of the first and second off times is an even multiple of $T_z$, the first and second off times are equal to each other, and when the total of the first and second off times is an odd multiple of $T_z$, the first and second off times are different from each other by $T_z$ and arranged in a fixed order within the pulse width modulation cycle.

12. The fixing device according to claim 11, wherein the first and second off times are arranged so that the first off time is prior to the second off time within the pulse width modulation cycle, when the total of the first and second off times is an odd multiple of $T_z$.

13. The method of controlling a heating device according to claim 9, wherein the pulse width modulation cycle has a length determined as a common multiple of inverses of frequencies of the alternating current to be used with the fixing device.

14. The method of controlling a heating device according to claim 9, wherein the drive signal is generated with the on time of a length corresponding to an interval between first and second zero crossings of the alternating current in the pulse width modulation cycle, the first zero crossing being nearest to a point at which the pulse signal transits from low to high, and the second zero crossing being nearest to a point at which the pulse signal transits from high to low.

15. The method of controlling a heating device according to claim 9, further comprising compensating for dead-time by outputting a compensation signal using a model in response to the signal obtained by the calculating.

16. A healing control device, comprising:

a heater to heat an object to a process temperature when driven with an alternating current supplied from a current source;

a detector to detect the process temperature and to output a detection signal indicating the process temperature;

a calculator to calculate an amount of heat to adjust the process temperature to a reference temperature according to the detection signal and to output a signal indicating the calculated amount of heat thereafter being output;

a pulse width modulation circuit to generate, according to the signal output from the calculator, a drive signal having a pulse width modulation cycle divided into a first off time, a second off time, and an on time between the first and second off times, the first and second off times each being a period in which the alternating current remains unsupplied to drive the heater and the on time being a period in which the alternating current is supplied to drive the heater; and a controller to control operation of the heater according to the drive signal, wherein the signal output from the calculator is a pulse signal having a pulse width proportional to the calculated amount of heat.

17. The heating control device according to claim 16, further comprising:
a dead-time compensator to compensate for dead-time by outputting, in response to the signal output by the calculator, a compensation signal using a model to the calculator.

18. An image forming apparatus, comprising:
an image forming unit to form an electrostatic latent image on an image carrier;
a development unit to develop the electrostatic latent image with toner to obtain a toner image;
a transfer unit to transfer the toner image onto a recording medium; and
the heating control device of claim 17 to fix the toner image on the recording medium.

19. The heating control device according to claim 16, wherein the pulse width modulation cycle has a length determined as a common multiple of inverses of frequencies of the alternating current to be used with the fixing device.

20. An image forming apparatus, comprising:
an image forming unit to form an electrostatic latent image on an image carrier;
a development unit to develop the electrostatic latent image with toner to obtain a toner image;
a transfer unit to transfer the toner image onto a recording medium; and
the heating control device of claim 16 to fix the toner image on the recording medium.

* * * * *